US011909119B2

(12) United States Patent
Yamada et al.

(10) Patent No.: US 11,909,119 B2
(45) Date of Patent: Feb. 20, 2024

(54) CIRCULAR POLARIZATION ARRAY ANTENNA DEVICE

(71) Applicant: Murata Manufacturing Co., Ltd., Nagaokakyo (JP)

(72) Inventors: Yoshiki Yamada, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 148 days.

(21) Appl. No.: 17/712,190

(22) Filed: Apr. 4, 2022

(65) Prior Publication Data

US 2022/0231427 A1 Jul. 21, 2022

Related U.S. Application Data

(63) Continuation of application No. PCT/JP2020/031600, filed on Aug. 21, 2020.

(30) Foreign Application Priority Data

Oct. 21, 2019 (JP) ................................ 2019-192022

(51) Int. Cl.
*H01Q 21/24* (2006.01)
*H01Q 15/24* (2006.01)
*H01Q 21/06* (2006.01)

(52) U.S. Cl.
CPC ........... *H01Q 21/061* (2013.01); *H01Q 15/24* (2013.01); *H01Q 15/242* (2013.01); *H01Q 21/24* (2013.01); *H01Q 21/245* (2013.01)

(58) Field of Classification Search
CPC .... H01Q 21/061; H01Q 21/24; H01Q 9/0435; H01Q 21/065; H01Q 1/36; H01Q 23/00; H01Q 15/24; H01Q 15/242; H01Q 3/36; H01Q 9/0428; H01P 5/22
See application file for complete search history.

(56) References Cited

U.S. PATENT DOCUMENTS

| | | | | |
|---|---|---|---|---|
| 11,171,421 | B2 * | 11/2021 | Yamada | H01Q 21/08 |
| 11,211,718 | B2 * | 12/2021 | Ueda | H01Q 21/245 |
| 11,348,269 | B1 * | 5/2022 | Ebrahimi Afrouzi | G06T 7/33 |
| 11,581,648 | B2 * | 2/2023 | Murch | H01Q 5/49 |

(Continued)

FOREIGN PATENT DOCUMENTS

| | | |
|---|---|---|
| JP | 53-39043 A | 4/1978 |
| JP | 63-167502 A | 7/1988 |

(Continued)

OTHER PUBLICATIONS

International Search Report and Written Opinion dated Nov. 10, 2020, Filed on Aug. 21, 2020, 8 pages including English Translation.

(Continued)

*Primary Examiner* — Vibol Tan
(74) *Attorney, Agent, or Firm* — XSENSUS LLP

(57) ABSTRACT

An antenna device is formed by arranging radiation elements each radiating a circularly polarized wave in a matrix of three rows and four columns. The radiation elements include three sets of radiation elements of four types having a positional relationship rotationally symmetric with each other. The radiation elements are arranged such that adjacent elements are of different types.

20 Claims, 11 Drawing Sheets

(56) References Cited

U.S. PATENT DOCUMENTS

| | | | | |
|---|---|---|---|---|
| 11,735,832 | B2 * | 8/2023 | Ueda | H01Q 21/0006<br>343/893 |
| 2022/0173530 | A1 * | 6/2022 | Ueda | H01Q 1/40 |

FOREIGN PATENT DOCUMENTS

| | | | |
|---|---|---|---|
| JP | 6-140835 | A | 5/1994 |
| JP | 2009-517904 | A | 4/2009 |
| JP | 2016-92564 | A | 5/2016 |

OTHER PUBLICATIONS

English Translation of the Written Opinion dated Nov. 10, 2020.

* cited by examiner

THREE ROWS AND FOUR COLUMNS

THREE ROWS AND FOUR COLUMNS

[COMPARATIVE EXAMPLE]

THREE ROWS AND SIX COLUMNS

THREE ROWS AND SIX COLUMNS

CIRCULAR POLARIZATION ARRAY ANTENNA DEVICE

CROSS-REFERENCE TO RELATED APPLICATIONS

The present application is a continuation application of International Patent Application No. PCT/JP2020/031600, filed Aug. 21, 2020, which claims priority to Japanese Patent Application No. 2019-192022, filed Oct. 21, 2019, the entire contents of each of which being incorporated herein by reference.

TECHNICAL FIELD

The present disclosure relates to a circular polarization array antenna device.

BACKGROUND ART

The circular polarization array antenna is realized by arranging a plurality of radiation elements each radiating a circularly polarized wave in proximity to each other. In an ideal circularly polarized wave, a magnitude of a rotating electric field is constant, but in reality, the magnitude of the rotating electric field may not be constant and may be distorted into an elliptical shape. A ratio of a minor axis to a major axis of the elliptical shape of the circularly polarized wave is referred to as an "axial ratio". In order to make a circularly polarized wave an ideal circularly polarized wave, it is required to improve axial ratio characteristics.

As a technique for improving the axial ratio characteristics of the circular polarization array antenna, there is a technique called a sequential array. In the sequential array, a plurality of circularly polarized radiation elements are arranged while each of which is rotated at an arbitrary angle. It is known that such an arrangement may improve the axial ratio characteristics of the entire circular polarization array antenna even when the axial ratio characteristics of a single radiation element are not preferable.

Japanese Unexamined Patent Application Publication No. 6-140835 discloses a circular polarization array antenna device in which a plurality of circularly polarized radiation elements are arranged in a matrix. In this circular polarization array antenna, 16 circularly polarized radiation elements are sequentially arranged in a matrix of four rows and four columns (even-numbered rows and even-numbered columns) such that a positional relationship between adjacent radiation elements comes into a positional relationship in which the radiation elements are rotated by a predetermined angle with each other and translated.

CITATION LIST

Patent Document

Patent Document 1: Japanese Unexamined Patent Application Publication No. 6-140835

SUMMARY

Technical Problem

In a case that a plurality of circularly polarized radiation elements are arranged in a matrix, arranging the plurality of circularly polarized radiation elements in a matrix of even-numbered rows and even-numbered columns as in the circular polarization array antenna disclosed in Japanese Unexamined Patent Application Publication No. 6-140835 may more effectively improve the axial ratio characteristics.

However, the size of the circular polarization array antenna may be restricted depending on the size of a device to which the circular polarization array antenna is attached, and there may be a case that the number of rows of the arrangement has to be an odd number instead of an even number (that is, the number of radiation elements in a single column has to be an odd number). In this case, the plurality of radiation elements are arranged in a matrix of odd-numbered rows and even-numbered columns, and improving the axial ratio characteristics is considered to be hard.

The present disclosure has been made in order to solve the problem above, and one object of the present disclosure is to make it simple to improve axial ratio characteristics even in the case that a plurality of radiation elements each capable of radiating a circularly polarized wave are arranged in a matrix of odd-numbered rows and even-numbered columns.

Solution to Problem

A circular polarization array antenna device according to the present disclosure includes an element group including a plurality of elements each capable of radiating a circularly polarized wave. The plurality of elements are arranged in a matrix of N rows and M columns, in which N is an odd number of three or more and M is four or more being a multiple of four. The plurality of elements include the same number of elements of four types having a positional relationship rotationally symmetric with each other. The plurality of elements are arranged such that adjacent elements are of types different from each other.

In the element group described above, the plurality of elements are arranged in a matrix of odd-numbered rows (N rows) and even-numbered columns (M columns). The plurality of elements include the same number of elements of four types and are arranged such that adjacent elements are of types different from each other. Consequently, even in the case that a plurality of elements each radiating a circularly polarized wave are arranged in a matrix of odd-numbered rows and even-numbered columns, it may be made simple to improve the axial ratio characteristics.

A circular polarization array antenna device according to another aspect of the present disclosure includes an element group that includes a plurality of elements each capable of radiating a circularly polarized wave and arranged in a matrix of three rows and K columns, in which K is an even number of four or more. The plurality of elements include elements of four types having a positional relationship rotationally symmetric with each other. The elements of four types include a first type element, a second type element obtained by rotating the first type element by 90 degrees in a predetermined direction, a third type element obtained by rotating the first type element by 270 degrees in the predetermined direction, and a fourth type element obtained by rotating the first type element by 180 degrees in the predetermined direction. The plurality of elements are included in: a plurality of first element groups each of which includes four elements arranged in two rows and two columns and which are disposed in a zigzag manner in a column direction; and a plurality of second element groups each of which includes two elements arranged in one row and two columns and each of which is disposed adjacent to a corresponding one of the plurality of first element groups in a row direction. The four elements included in the first element group include each one of the elements of four types. The two elements included in the second element group include elements of two of the four types.

Advantageous Effects

According to the present disclosure, even in a case that a plurality of radiation elements each capable of radiating a circularly polarized wave are arranged in a matrix of odd-numbered rows and even-numbered columns, it may be made simple to improve the axial ratio characteristics.

DESCRIPTION OF EMBODIMENTS

Figure 1:
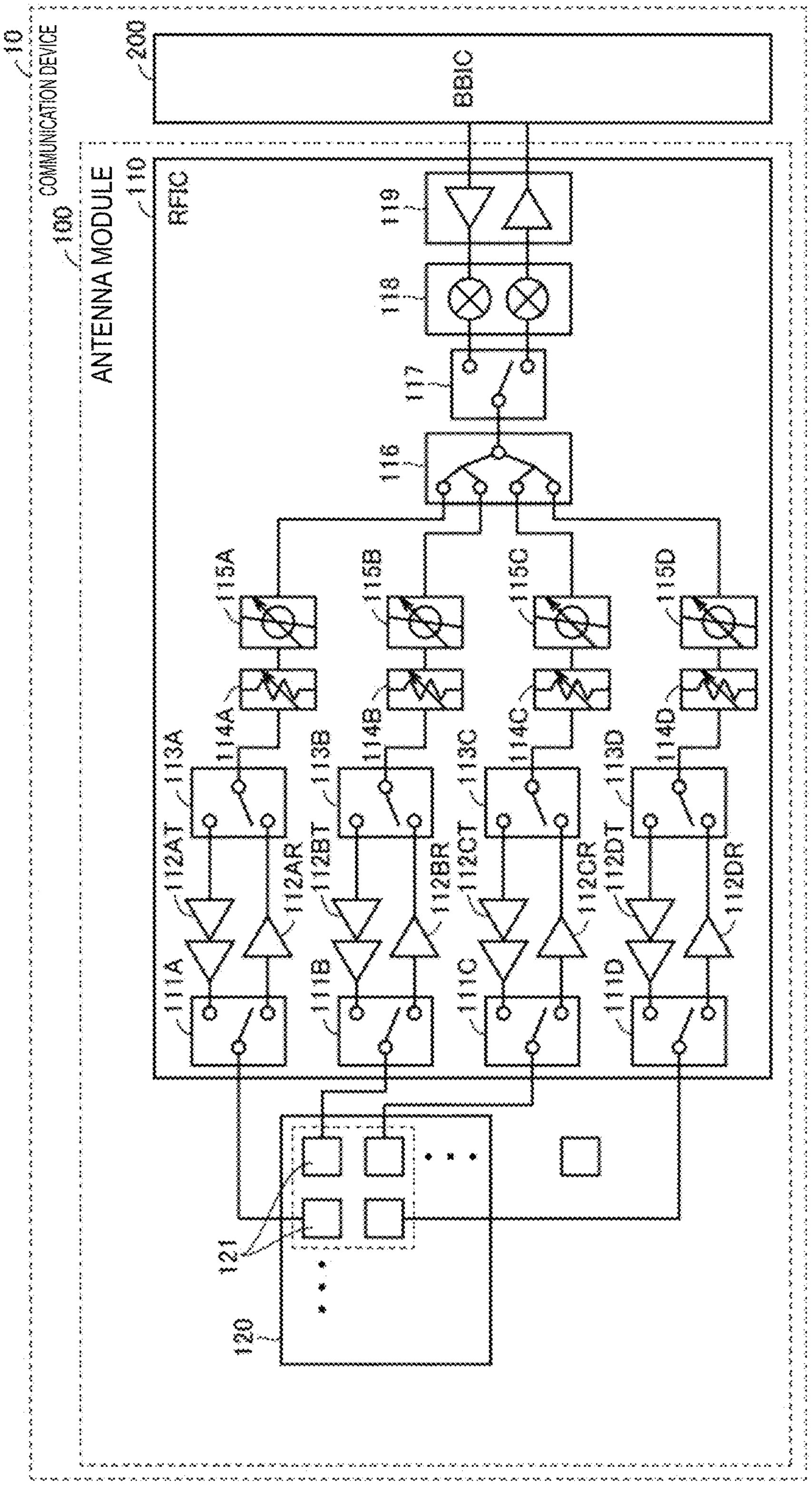
FIG. 1 is an example of a block diagram of a communication device to which an antenna device is applied.

Hereinafter, embodiments of the present disclosure will be described in detail with reference to the drawings. In the drawings, the same or corresponding portions are denoted by the same reference signs, and description thereof will not be repeated.

(Basic Configuration of Communication Device)

FIG. 1 is an example of a block diagram of a communication device 10 to which an antenna device 120 according to the present embodiment is applied. The communication device 10 is configured to be capable of transmitting a circularly polarized wave from the antenna device 120. The communication device 10 may be, for example, a terminal transmitting data to a wearable terminal (such as a head-mounted display, for example) whose relative position to the communication device 10 may change. In addition, the communication device 10 may be a communication terminal supporting "WiGig" which is a wireless communication standard mainly using 60 GHz band radio, for example.

The communication device 10 includes an antenna module 100 including the antenna device 120 and a BBIC 200 constituting a baseband signal processing circuit. The antenna module 100 includes an RFIC 110 that is an example of a power feeding component in addition to the antenna device 120. The communication device 10 up-converts a signal transferred from the BBIC 200 to the antenna module 100 into a radio frequency signal and radiates the radio frequency signal from the antenna device 120. The communication device 10 down-converts a radio frequency signal received by the antenna device 120 and processes the signal in the BBIC 200.

The antenna device 120 includes a plurality of radiation elements 121 each configured to be capable of radiating a circularly polarized wave. In FIG. 1, for ease of explanation, only a configuration corresponding to four radiation elements 121 among the plurality of radiation elements 121 included in the antenna device 120 is illustrated, and configurations corresponding to other radiation elements 121 having the same configuration are omitted. In the present embodiment, the radiation element 121 is a patch antenna having a substantially square flat plate shape.

The RFIC 110 includes switches 111A to 111D, 113A to 113D, and 117, power amplifiers 112AT to 112DT, low noise amplifiers 112AR to 112DR, attenuators 114A to 114D, phase shifters 115A to 115D, a signal multiplexer/demultiplexer 116, a mixer 118, and an amplifier circuit 119.

When transmitting a radio frequency signal, the switches 111A to 111D and 113A to 113D are switched to the power amplifiers 112AT to 112DT side, and the switch 117 is switched to a transmission-side amplifier in the amplifier circuit 119. When a radio frequency signal is received, the switches 111A to 111D and 113A to 113D are switched to the low noise amplifiers 112AR to 112DR side, and the switch 117 is switched to a reception-side amplifier in the amplifier circuit 119.

A signal transferred from the BBIC 200 is amplified by the amplifier circuit 119, and is up-converted by the mixer 118. The transmission signal, which is an up-converted radio frequency signal, is divided into four waves by the signal multiplexer/demultiplexer 116. The waves pass through four signal paths and are fed to the respective different radiation elements 121. At this time, by individually adjusting phase shift degrees in the phase shifters 115A to 115D disposed in respective signal paths, circularly polarized waves having the same phase are radiated from the respective radiation elements 121 of the antenna device 120.

Reception signals, which are radio frequency signals received by the radiation elements 121, pass through respective four different signal paths and are combined by the signal multiplexer/demultiplexer 116. The combined received signal is down-converted by the mixer 118, amplified by the amplifier circuit 119, and transferred to the BBIC 200.

The RFIC 110 is formed as a single chip integrated circuit component including the circuit configuration described above, for example. Alternatively, the devices (switches, power amplifiers, low noise amplifiers, attenuators, and phase shifters) corresponding to each radiation element 121 in the RFIC 110 may be formed as a single chip integrated circuit component for each corresponding radiation element 121.

(Antenna Device and Arrangement of Radiation Elements)

Figure 2:
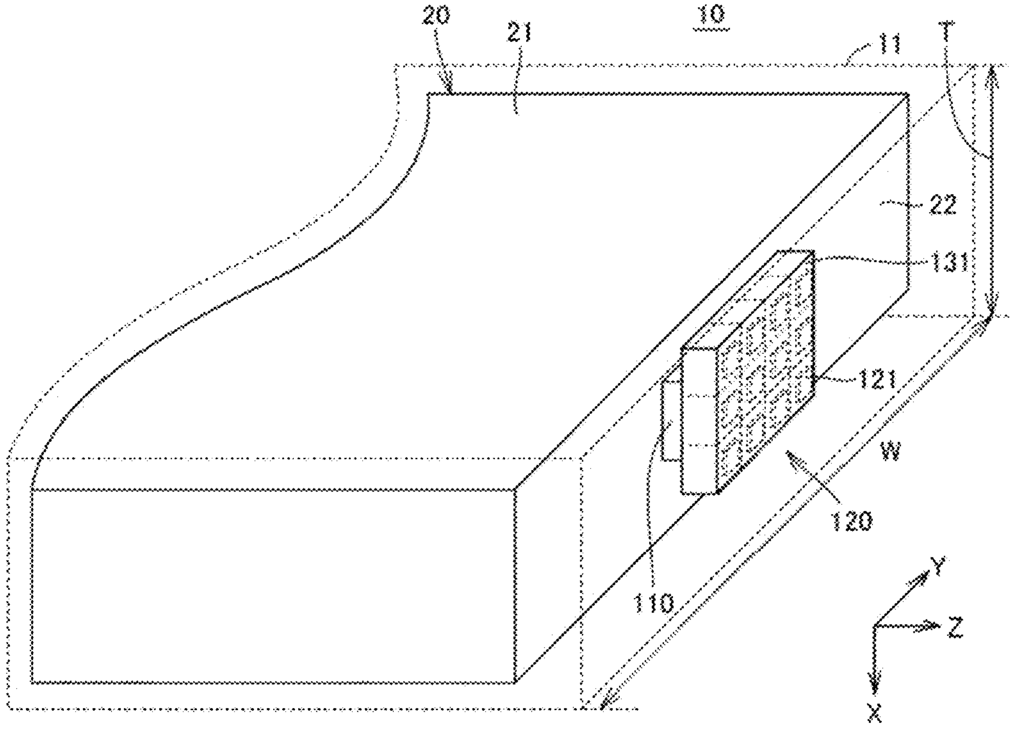
FIG. 2 is a transparent perspective view of the communication device illustrating the inside thereof.

FIG. 2 is a transparent perspective view of the communication device 10 illustrating the inside thereof. The communication device 10 is covered with a housing 11. The housing 11 accommodates the antenna device 120, the RFIC 110, a mounting substrate 20, and the like.

The antenna device 120 includes a plate-shaped dielectric substrate 131 having a multilayer structure, and the plurality of radiation elements 121 disposed inside the dielectric substrate 131. The dielectric substrate 131 is disposed on a side surface 22 of the mounting substrate 20 with the RFIC 110 interposed therebetween. Hereinafter, as illustrated in FIG. 2, a normal direction of the side surface 22 of the mounting substrate 20 is referred to as a "Z axis direction", a normal direction of a main surface 21 of the mounting substrate 20 is referred to as an "X axis direction", and a direction perpendicular to the Z axis direction and the X axis direction is referred to as a "Y axis direction".

The dielectric substrate 131 is provided with an antenna layer in which the plurality of radiation elements 121 are arranged. In the antenna layer, the plurality of radiation elements 121 are arranged in a matrix along the X axis direction and the Y axis direction. Specifically, 12 radiation elements 121 are arranged in a matrix of three rows and four columns with the X axis direction being a "row" and the Y axis direction being a "column".

In general, in a case that a plurality of circularly polarized radiation elements are arranged in a matrix, arranging the plurality of circularly polarized radiation elements in a matrix of even-numbered rows and even-numbered columns, such as in the circular polarization array antenna disclosed in Japanese Unexamined Patent Application Publication No. 6-140835, may more effectively improve the axial ratio characteristics.

However, in the antenna device 120 according to the present embodiment, the length of the dielectric substrate 131 in the X axis direction is limited by the thickness (length in the X axis direction) T of the housing 11, and thus, the number of rows of the arrangement of the plurality of radiation elements 121 is three rows (odd-numbered rows). Accordingly, without any countermeasures, it may be hard to improve the axial ratio characteristics as compared with the case that the plurality of radiation elements 121 are arranged in a matrix of even-numbered rows and even-numbered columns.

Then, in the antenna device 120 according to the present embodiment, arranging the plurality of radiation elements 121 in the following manner makes it simple to improve the axial ratio characteristics even in the case that the plurality of radiation elements 121 are arranged in a matrix of three rows and four columns (odd-numbered rows and even-numbered columns).

Figure 3:
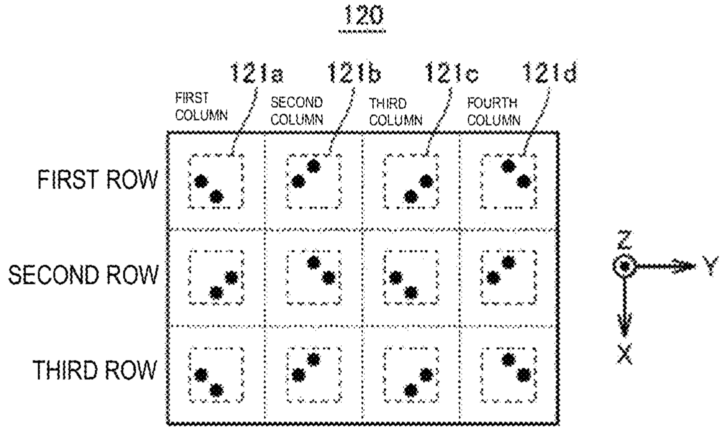
FIG. 3 is a diagram illustrating an arrangement of a plurality of radiation elements in the antenna device.

FIG. 3 is a diagram illustrating an arrangement of the plurality of radiation elements 121 in the antenna device 120 according to the present embodiment. In the present embodiment, the 12 radiation elements 121 are arranged in a matrix of three rows and four columns, as described above. Each radiation element 121 has two feed points. Two radio frequency signals having a phase difference of 90° relatively to each other are supplied from a hybrid circuit 132 illustrated in FIG. 9, which will be described later, to the two feed points of each radiation element 121. With this, a circularly polarized wave is radiated from each radiation element 121.

The 12 radiation elements 121 include radiation elements of four types having a positional relationship rotationally symmetric with each other. That is, the 12 radiation elements 121 include a first type radiation element 121*a*, a second type radiation element 121*b*, a third type radiation element 121*c*, and a fourth type radiation element 121*d*. The same numbers (that is, three) of the radiation elements 121*a* to 121*d* of four types are included.

Figure 4:
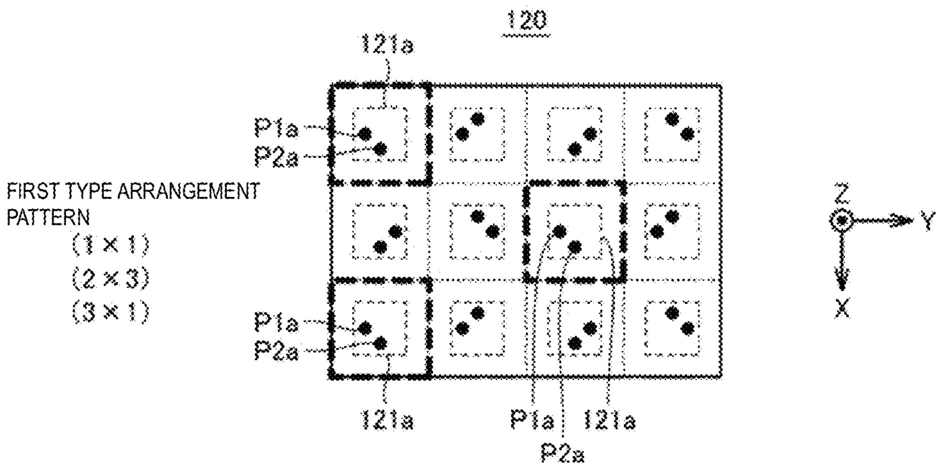
FIG. 4 is a diagram illustrating an arrangement pattern of a first type radiation element.
Figure 5:
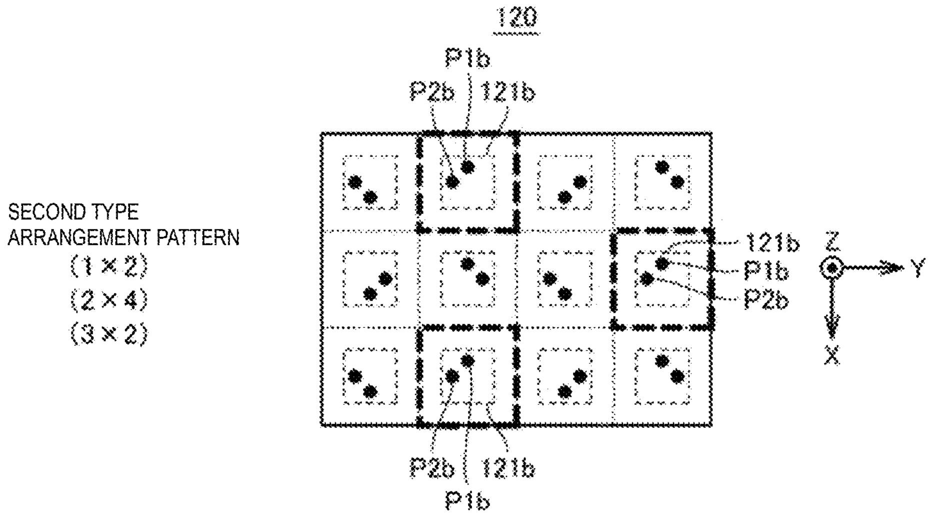
FIG. 5 is a diagram illustrating an arrangement pattern of a second type radiation element.
Figure 6:
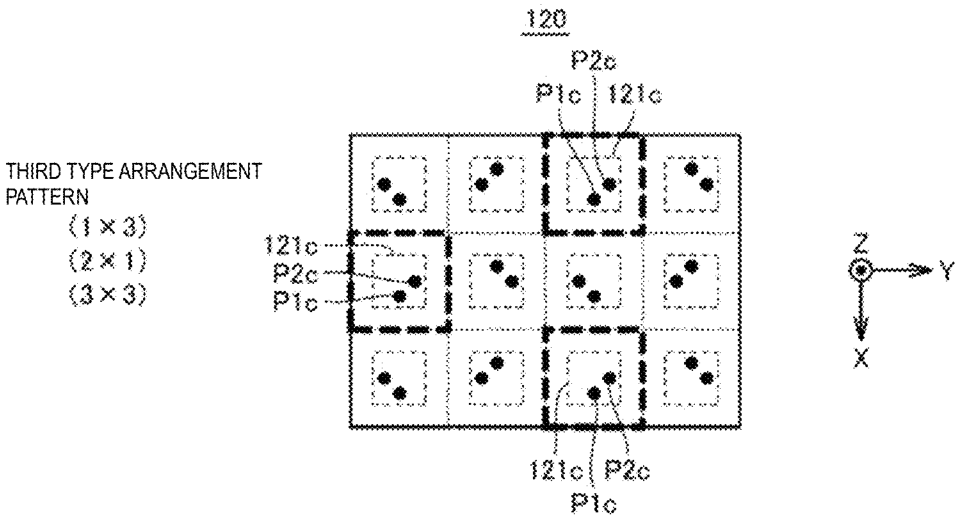
FIG. 6 is a diagram illustrating an arrangement pattern of a third type radiation element.
Figure 7:
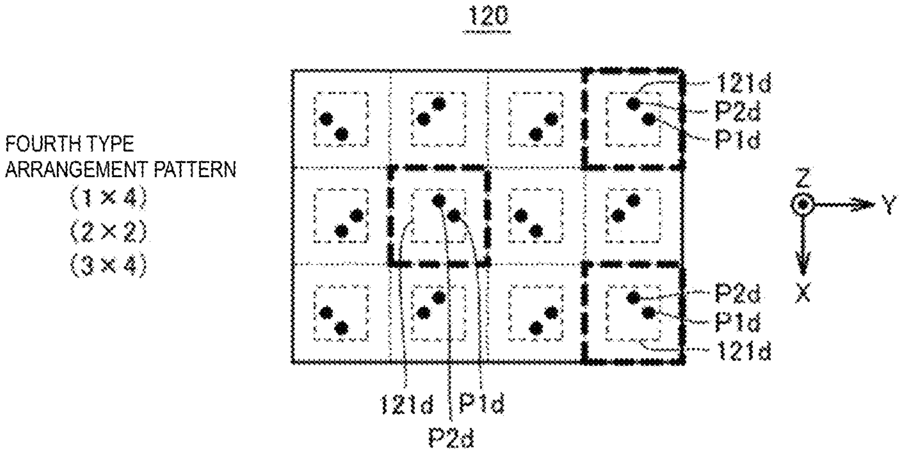
FIG. 7 is a diagram illustrating an arrangement pattern of a fourth type radiation element.

FIG. 4 is a diagram illustrating an arrangement pattern of the first type radiation element 121*a*. FIG. 5 is a diagram illustrating an arrangement pattern of the second type radiation element 121*b*. FIG. 6 is a diagram illustrating an arrangement pattern of the third type radiation element 121*c*. FIG. 7 is a diagram illustrating an arrangement pattern of the fourth type radiation element 121*d*. In the following description, any integer from 1 to 3 is denoted by n, any integer from 1 to 4 is denoted by m, and a position of the n-th row and the m-th column in a matrix is denoted by (n×m).

As illustrated in FIG. 4, the first type radiation element 121*a* is disposed at positions of (1×1), (2×3), and (3×1). Each radiation element 121*a* includes a feed point P1*a* disposed at a negative direction side of the Y axis relative to a surface center, and a feed point P2*a* disposed at a positive direction side of the X axis relative to the surface center.

As illustrated in FIG. 5, the second type radiation element 121*b* is disposed at positions of (1×2), (2×4), and (3×2). Each radiation element 121*b* includes a feed point P1*b* disposed at the negative direction side of the X axis relative to the surface center, and a feed point P2*b* disposed at the negative direction side of the Y axis relative to the surface center. The second type radiation element 121*b* is obtained by rotating the first type radiation element 121*a* clockwise by 90 degrees and translating the rotated first type radiation element 121*a*.

As illustrated in FIG. 6, the third type radiation element 121*c* is disposed at positions of (1×3), (2×1), and (3×3). Each radiation element 121*c* includes a feed point P1*c* disposed at the positive direction side of the X axis relative to the surface center, and a feed point P2*c* disposed at the positive direction side of the Y axis relative to the surface center. The third type radiation element 121*c* is obtained by rotating the first type radiation element 121*a* clockwise by 270 degrees and translating the rotated first type radiation element 121*a*.

As illustrated in FIG. 7, the fourth type radiation element 121*d* is disposed at positions of (1×4), (2×2), and (3×4). Each radiation element 121*d* includes a feed point P1*d* disposed at the positive direction side of the Y axis relative to the surface center, and a feed point P2*d* disposed at the negative direction side of the X axis relative to the surface center. The fourth type radiation element 121*d* is obtained by rotating the first type radiation element 121*a* clockwise by 180 degrees with surface center being the rotational axis, and translating the rotated first type radiation element 121*a*.

With the arrangement above, the plurality of radiation elements 121 are arranged such that any one radiation element 121 and the radiation elements 121 disposed around (vertically, horizontally, and obliquely) the one radiation element 121 are of types different from each other. For example, the first type radiation element 121*a* at (1×1) is of a different type from any of the third type radiation element 121*c* at (2×1) adjacent in the lower side, the second type radiation element 121*b* at (1×2) adjacent in the right side, and the fourth type radiation element 121*d* at (2×2) adjacent in the obliquely lower right. Further, for example, the first type radiation element 121*a* at (2×3) is of a different type from any of: the third type radiation element 121*c* at (1×3) adjacent in the upper side, the third type radiation element 121*c* at (3×3) adjacent in the lower side, the fourth type radiation element 121*d* at (2×2) adjacent in the left side, the second type radiation element 121*b* at (2×4) adjacent in the right side, the second type radiation element 121*b* at (1×2) adjacent in the obliquely upper left, the second type radiation element 121*b* at (3×2) adjacent in the obliquely lower left, the fourth type radiation element 121*d* at (1×4) adjacent in the obliquely upper right, and the fourth type radiation element 121*d* at (3×4) adjacent in the obliquely lower right.

By arranging the radiation elements 121*a* to 121*d* of four types as described above, the plurality of radiation elements 121 are uniformly and sequentially arranged, and overall balance is achieved. Consequently, even in the case that the plurality of radiation elements 121 are arranged in a matrix of three rows and four columns, it may be made simple to improve the axial ratio characteristics.

With the rotation position (rotation angle) of the first type radiation element 121*a* being "reference (0 degrees)", the clockwise rotation position of each radiation element 121 is expressed as follows. The rotation position of the second type radiation element 121*b* is "90 degrees", the rotation position of the third type radiation element 121*c* is "270 degrees", and the rotation position of the fourth type radiation element 121*d* is "180 degrees". In light of the above, the phase shift degrees of the phase shifters 115A to 115D are individually adjusted as follows when the phase of a signal supplied to the first type radiation element 121*a* is expressed as a "reference phase". The phase of a signal supplied to the second type radiation element 121*b* is "reference phase minus 90 degrees", the phase of a signal supplied to the third type radiation element 121*c* is "reference phase minus 270 degrees", and the phase of a signal supplied to the fourth type radiation element 121*d* is "reference phase minus 180 degrees". With this, circularly polarized waves of the same phase are radiated from the respective radiation elements 121 of the antenna device 120.

Figure 8:
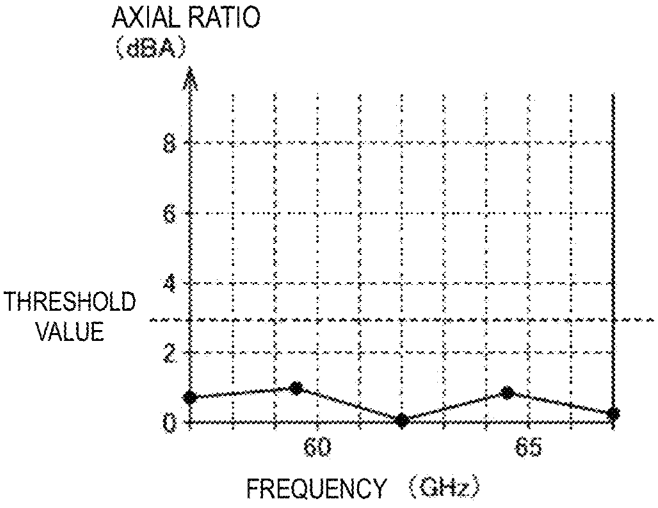
FIG. 8 is a graph illustrating axial ratio characteristics of a circularly polarized wave radiated from the antenna device.

FIG. 8 is a graph illustrating axial ratio characteristics of a circularly polarized wave radiated from the antenna device 120 according to the present embodiment. In FIG. 8, the horizontal axis represents a frequency (GHz in unit), and the vertical axis represents an axial ratio (dBA in unit). In general, with 3 dBA being a threshold value, the axial ratio characteristics is evaluated as preferable when the axial ratio is 3 dBA or less. In the antenna device 120 according to the present embodiment, the axial ratio is suppressed to be substantially less than 1 dBA in the frequency band of about 60 GHz with the above-described arrangement pattern, and therefore, it may be understood that the axial ratio characteristics are preferable.

As described above, in the antenna device 120 according to the present embodiment, the 12 radiation elements 121 each radiating a circularly polarized wave are arranged in a matrix of three rows and four columns. The 12 radiation elements 121 includes three sets of radiation elements 121*a* to 121*d* of four types having a positional relationship rotationally symmetric with each other. The first type radiation element 121*a* is disposed at positions of (1×1), (2×3), and (3×1). The second type radiation element 121*b* is disposed at positions of (1×2), (2×4), and (3×2). The third type radiation element 121*c* is disposed at positions of (1×3), (2×1), and (3×3). The fourth type radiation element 121*d* is disposed at positions of (1×4), (2×2), and (3×4).

With the arrangement above, the plurality of radiation elements 121 are sequentially arranged such that radiation elements 121 adjacent to each other in vertical, horizontal, and oblique directions are of different types. Consequently, even in the case that the plurality of radiation elements 121 are arranged in a matrix of three rows and four columns, it may be made simple to improve the axial ratio characteristics.

The "antenna device 120" and the "12 radiation elements 121" according to the present embodiment may correspond to the "circular polarization array antenna device" and the "plurality of elements" of the present disclosure, respectively. The element group including the 12 radiation elements 121 according to Modification 1 may correspond to the "element group" of the present disclosure. Further, the "first type radiation element 121*a*", the "second type radiation element 121*b*", the "third type radiation element 121*c*", and the "fourth type radiation element 121*d*" according to the present embodiment may correspond to the "first type element", the "second type element", the "third type element", and the "fourth type element" of the present disclosure, respectively.

(Configuration of Hybrid Circuit)

The antenna device 120 has a multilayer structure in which an antenna layer, a wiring layer, and a GND layer are laminated in this order from the positive direction to the negative direction of the Z axis.

Figure 9:
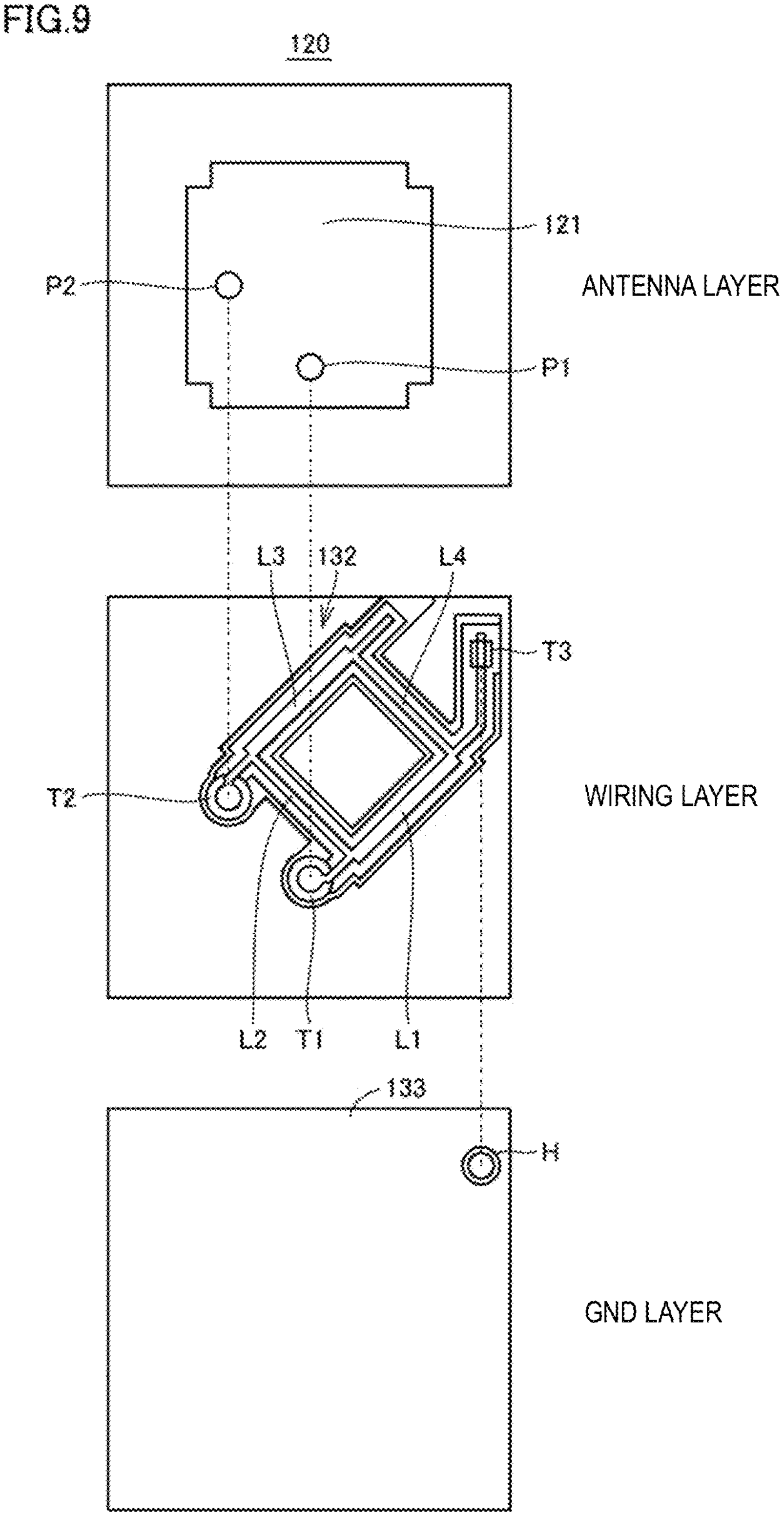
FIG. 9 is a transparent view of an antenna layer, a wiring layer, and a GND layer of the antenna device viewed in a Z axis direction.

FIG. 9 is a diagram in which the antenna layer, the wiring layer, and the GND layer of the antenna device 120 are viewed transparently in the Z axis direction and arranged in this order from the top. Note that, only an arrangement area of any single radiation element 121 is illustrated in FIG. 9.

The above-described radiation element 121 is arranged in the antenna layer. In FIG. 9, a shape of the radiation element 121 in which four corners are cut out is illustrated as an example.

In the wiring layer, one hybrid circuit 132 is disposed for one radiation element 121. That is, 12 hybrid circuits 132 corresponding to the respective 12 radiation elements 121 are disposed in the wiring layer of the antenna device 120. The hybrid circuit 132 is a 90 degrees hybrid circuit for supplying two radio frequency signals having a phase difference of 90 degrees to respective two feed points P1 and P2 of the corresponding radiation element 121.

Specifically, the hybrid circuit 132 includes three terminals T1 to T3 and four linear transmission lines L1 to L4. The terminals T1 and T2 are coupled to the feed points P1 and P2 of the radiation element 121 by lines, which are not illustrated, respectively. The terminal T3 is coupled to the RFIC 110 by a line, which is not illustrated.

Each of the four transmission lines L1 to L4 is configured such that an electrical length thereof is ¼ of the wavelength of the radio frequency signal. The four transmission lines L1 to L4 are annularly coupled in this order. That is, one end of the transmission line L1 is coupled to one end of the transmission line L2, another end of the transmission line L2 is coupled to one end of the third transmission line, another end of the transmission line L3 is coupled to one end of the transmission line L4, and another end of the transmission line L4 is coupled to another end of the transmission line L1. The terminal T1 is coupled to a coupling point between the transmission line L1 and the transmission line L2. The terminal T2 is coupled to a coupling point between the transmission line L2 and the transmission line L3. The terminal T3 is coupled to a coupling point between the transmission line L1 and the transmission line L4.

A ground electrode 133 is disposed in the GND layer. The ground electrode 133 is provided with a power supply land H. A line for supplying a radio frequency signal from the RFIC 110 to the terminal T3 of the hybrid circuit 132 is coupled to the power supply land H.

By supplying the radio frequency signal from the RFIC 110 to the hybrid circuit 132, two radio frequency signals having a relative phase difference of 90° are supplied to the respective two feed points P1 and P2 of the radiation element 121. That is, a signal inputted to the terminal T3 of the hybrid circuit 132 from the RFIC 110 is branched into a signal outputted from the terminal T1 to the feed point P1 of the radiation element 121 through the transmission line L1, and a signal outputted from the terminal T2 to the feed point P2 of the radiation element 121 through the transmission lines L4 and L3. The phase of the outputted signal from the terminal T2 is delayed by 180 degrees (½ wavelength) relative to the signal inputted to the terminal T3, while the phase of the outputted signal from the terminal T1 is delayed by 90 degrees (¼ wavelength) relative to the signal inputted to the terminal T3. With this, the phase of the outputted signal from the terminal T2 may be delayed by 90 degrees (¼ wavelength) relative to the outputted signal from the terminal T1. Consequently, two radio frequency signals having a phase difference of 90 degrees may be supplied to the two feed points P1 and P2 of the radiation element 121.

<Modification 1>

In the embodiment described above, there has been described the antenna device 120 in which the plurality of radiation elements 121 are arranged in a matrix of three rows and four columns. However, it is sufficient that the antenna device according to the present disclosure includes an element group in which a plurality of radiation elements are arranged in a matrix of odd-numbered rows and even-numbered columns, and the number of rows and the number of columns when a plurality of radiation elements are arranged in a matrix are not necessarily limited to the "three rows" and the "four columns" described above.

Figure 10:
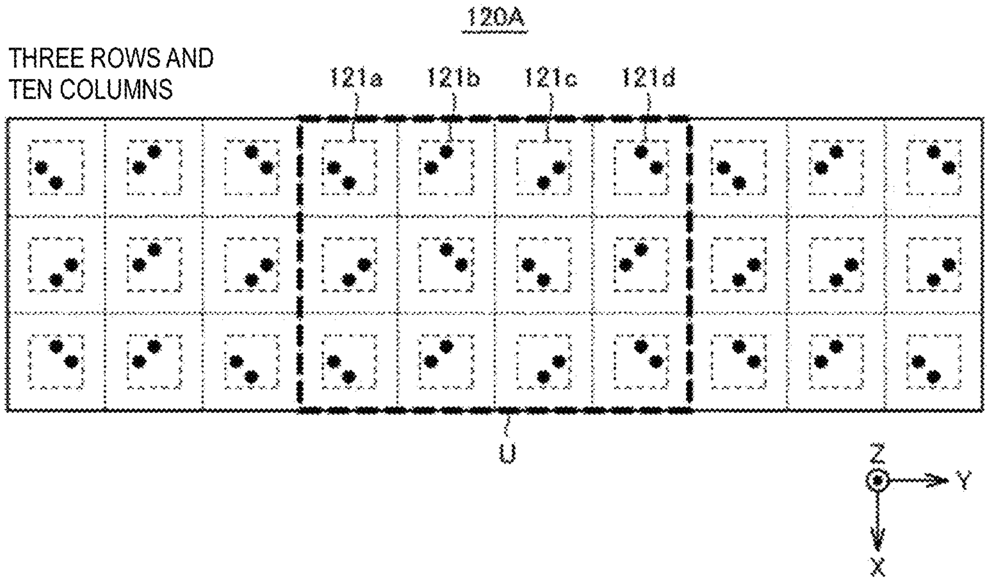
FIG. 10 is a diagram illustrating an example of an arrangement of a plurality of radiation elements in an antenna device according to Modification 1.

FIG. 10 is a diagram illustrating an example of an arrangement of the plurality of radiation elements 121 in an antenna device 120A according to Modification 1. In the example illustrated in FIG. 10, 30 radiation elements 121 are arranged in a matrix of three rows and ten columns. In the arrangement above, a portion arranged in three rows and four columns in the center portion is defined as an "element group U", and the element group U may have the arrangement pattern of the embodiment described above (FIG. 3 to FIG. 7), for example. With this, at least the portion of the element group U becomes the sequential arrangement, and therefore, it may be made simple to improve the axial ratio characteristics of the entire antenna device 120A.

Further, also in the above-described "element group U", it is sufficient that the number of rows and the number of columns when a plurality of radiation elements are arranged in a matrix, are respectively an odd number of three or more and four or more being a multiple of four (even number). The number of rows and the number of columns are not necessarily limited to the above-described "three rows" and "four columns". The "element group U" according to Modification 1 may correspond to the "element group" of the present disclosure.

<Modification 2>

In the embodiment described above, there has been described an example in which the hybrid circuit 132 including the four linear transmission lines L1 to L4 is used (see FIG. 9) as a circuit for supplying two radio frequency signals having a phase difference of 90 degrees to each radiation element 121. However, in this example, the power supply land H is close to the end portion of the arrangement area of the radiation element 121 as illustrated in FIG. 9, and it is considered that forming the power supply land H in the arrangement area becomes hard.

Accordingly, in Modification 2, the two transmission lines L1 and L3 of the four transmission lines L1 to L4 are formed in a curved shape, so that the power supply land H is brought close to the center of the arrangement area of the radiation element 121 to make it simple to form the power supply land H in the arrangement area.

Figure 11:
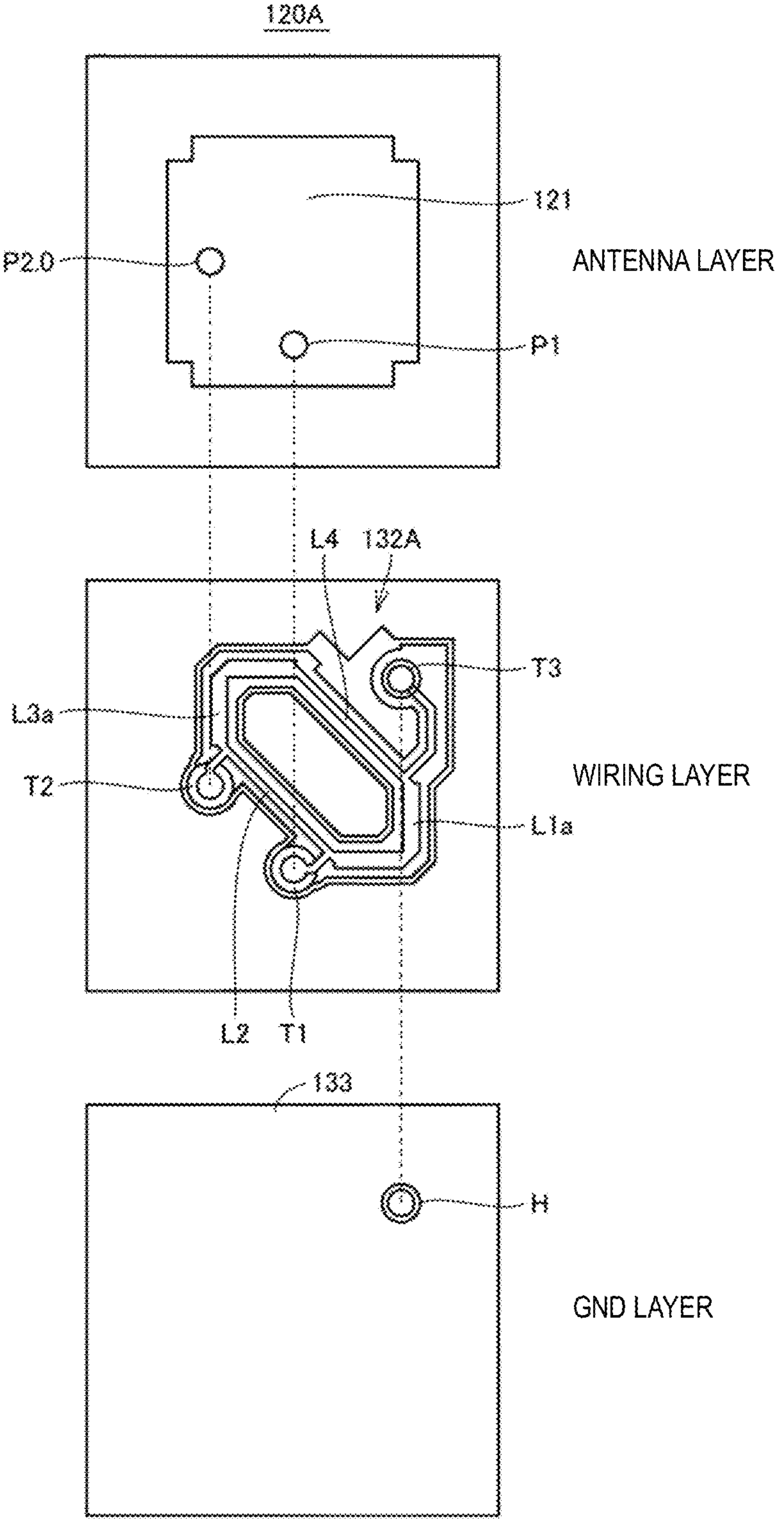
FIG. 11 is a transparent view of an antenna layer, a wiring layer, and a GND layer of an antenna device according to Modification 2 viewed in the Z axis direction.

FIG. 11 is a diagram in which an antenna layer, a wiring layer, and a GND layer of the antenna device 120A according to Modification 2 are viewed transparently in the Z axis direction and arranged in this order from the top.

In the wiring layer of the antenna device 120A, a hybrid circuit 132A is disposed instead of the above-described hybrid circuit 132. The hybrid circuit 132A differs from the above-described hybrid circuit 132 in that the linear transmission lines L1 and L3 are replaced by transmission lines L1*a* and L3*a* curved in an L-shape. Since other configurations of the hybrid circuit 132A are basically the same as those of the above-described hybrid circuit 132, detailed description thereof will not be repeated here.

As illustrated in FIG. 11, in the hybrid circuit 132A according to Modification 2, the terminal T3 is arranged at a position close to the terminals T1 and T2 by making the transmission lines L1*a* and L3*a* be a curved shape. With this, since the power supply land H becomes close to the center of the arrangement area of the radiation element 121, it may be made simple to form the power supply land H in the arrangement area.

The "hybrid circuit 132A", "terminal T1", "terminal T2", "terminal T3", "first transmission line L1*a*", "second transmission line L2", "third transmission line L3*a*", and "fourth transmission line L4" according to the present modification may correspond to the "hybrid circuit", "first terminal", "second terminal", "third terminal", "first transmission line", "second transmission line", "third transmission line", and "fourth transmission line" of the present disclosure, respectively.

<Modification 3>

In the embodiment described above, there has been described an example in which the hybrid circuit 132 is used (see FIG. 9) as a circuit for supplying two radio frequency signals having a phase difference of 90 degrees to each radiation element 121. However, the hybrid circuit 132 may be changed to a simple branch circuit.

Figure 12:
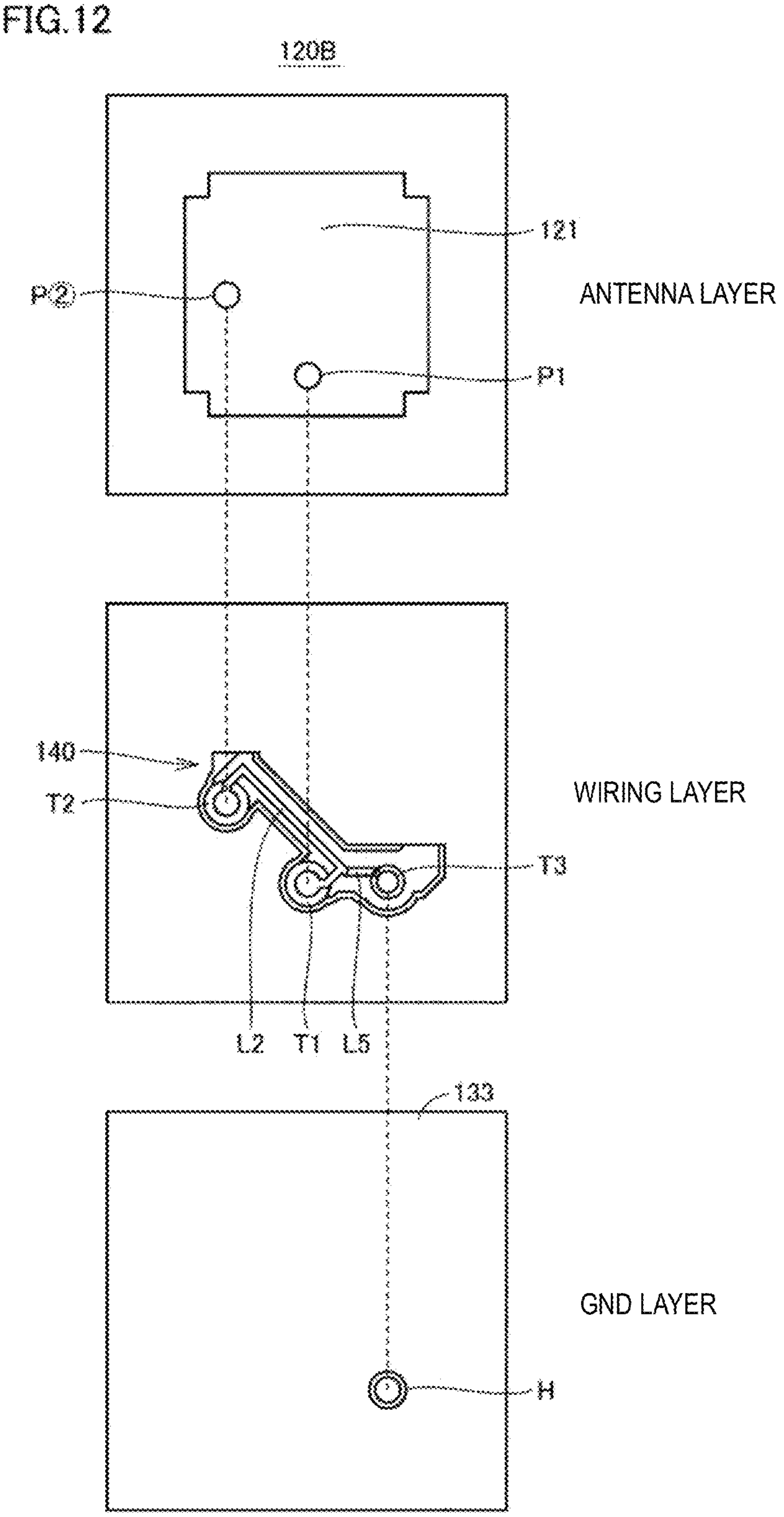
FIG. 12 is a transparent view of an antenna layer, a wiring layer, and a GND layer of an antenna device according to Modification 3 viewed in the Z axis direction.

FIG. 12 is a diagram in which an antenna layer, a wiring layer, and a GND layer of an antenna device 120B according to Modification 3 are viewed transparently in the Z axis direction and arranged in this order from the top.

A branch circuit 140, instead of the above-described hybrid circuit 132, is disposed in the wiring layer of the antenna device 120B.

The branch circuit 140 is obtained by omitting the transmission lines L1, L3 and L4 from the above-described hybrid circuit 132, and further, adding a transmission line L5 for coupling the terminal T1 and the terminal T3 to the above-described hybrid circuit 132. By supplying a radio frequency signal from the RFIC 110 to the branch circuit 140 above, two radio frequency signals having a phase difference of 90 degrees may be supplied to the radiation element 121. That is, a signal inputted from the RFIC 110 to the terminal T3 of the branch circuit 140 is branched into a signal outputted from the terminal T1 to the feed point P1 of the radiation element 121 through the transmission line L5, and a signal outputted from the terminal T2 to the feed point P2 of the radiation element 121 through the transmission lines L5 and L2. The phase of the outputted signal from the terminal T2 is delayed by 90 degrees (¼ wavelength), which is the electrical length of the transmission line L2, relative to the outputted signal from the terminal T1. Consequently, two radio frequency signals having a phase difference of 90 degrees may be supplied to the two feed points P1 and P2 of the radiation element 121.

<Modification 4>

In the embodiment described above, there has been described the radiation element 121 of the two-point feed system as the circularly polarized radiation element. However, a radiation element of a single point feed system, which uses degeneracy obtained by making the shape of the radiation electrode asymmetric, may be used as a circularly polarized radiation element.

<Modification 5>

In the embodiment described above, there has been described an example in which the radiation element 121 is a patch antenna. However, it is sufficient that the radiation element 121 is an antenna capable of radiating a circularly polarized wave, and the radiation element 121 is not necessarily limited to a patch antenna. For example, the radiation element 121 may be a slot antenna.

<Modification 6>

In the embodiment described above, the arrangement of the radiation elements 121 in the antenna device 120 illustrated in FIG. 3 to FIG. 7 described above is regarded as a pattern in which three sets of radiation elements 121*a* to 121*d* of four types are arranged such that adjacent radiation elements are of types different from each other. However, the arrangement of the radiation elements 121 in the above-described antenna device 120 may be regarded as follows.

Figure 13:
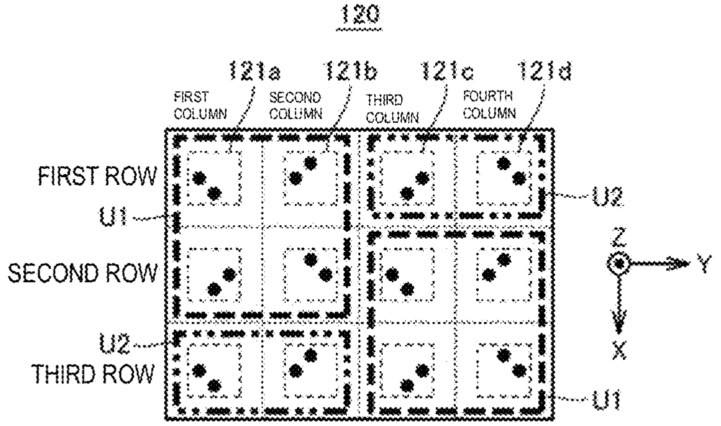
FIG. 13 is a diagram illustrating an arrangement of a plurality of radiation elements in an antenna device according to Modification 6.

FIG. 13 is a diagram illustrating an arrangement of the plurality of radiation elements 121 in the antenna device 120 according to Modification 6. The antenna device 120 illustrated in FIG. 13 is the same as the antenna device 120 illustrated in FIG. 3 to FIG. 7 described above. Accordingly, the arrangement itself of the radiation elements 121 illustrated in FIG. 13 is the same as the arrangement illustrated in FIG. 3 to FIG. 7 described above. However, in Modification 6, the arrangement of the radiation elements 121 in the antenna device 120 is regarded as an arrangement pattern satisfying the following requirements 1 to 3.

(Requirement 1) A plurality of first element groups U1 each including the four radiation elements 121 arranged in two rows and two columns are disposed in a zigzag manner in the column direction. The four radiation elements 121 included in each first element group U1 include each one of the radiation elements 121*a* to 121*d* of four types.

(Requirement 2) Each of a plurality of second element groups U2 includes the two radiation elements 121 arranged in one row and two columns and is disposed adjacent to corresponding one of the first element groups U1 in the row direction. The two radiation elements 121 included in each of the second element groups U2 include two types of the radiation elements 121 among the radiation elements 121*a* to 121*d* of four types. That is, one of the two radiation elements 121 included in each of the second element groups U2 is an element of a type obtained by rotating the other by 90 degrees or 180 degrees.

(Requirement 3) Each of the two radiation elements 121 included in each of the second element groups U2 is an element of a type obtained by rotating at least one of the radiation elements 121 in the first element group U1, both of which are adjacent to the two radiation elements 121, by 90 degrees.

In Modification 6, the arrangement pattern of the radiation elements 121 in the antenna device 120 is regarded as an arrangement pattern satisfying the requirements 1 to 3 above. That is, in the case of the arrangement pattern satisfying the requirements 1 to 3 above, even when the plurality of radiation elements 121 are arranged in a matrix of three rows and four columns, it may be made simple to improve the axial ratio characteristics similarly to the embodiment described above.

As long as the arrangement pattern satisfies the requirements 1 to 3 above, it is sufficient that the number of columns is an even number when a plurality of radiation elements are arranged in a matrix, and the number of rows is not necessarily limited to a multiple of four. That is, when any even number of four or more is defined as K, the arrangement pattern satisfying the requirements 1 to 3 above may be applied to a circular polarization array antenna device that includes an element group including the plurality of radiation elements 121 arranged in a matrix of three rows and K columns.

Figure 14:
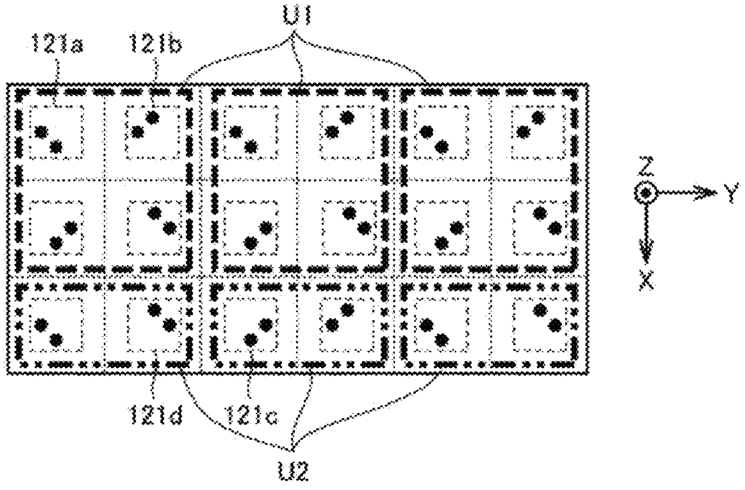
FIG. 14 is a diagram illustrating an arrangement of a plurality of radiation elements in an antenna device according to a comparative example.

FIG. 14 is a diagram illustrating the arrangement of the plurality of radiation elements 121 in an antenna device according to a comparative example. In the comparative example illustrated in FIG. 14, the plurality of radiation elements 121 are arranged in a matrix of three rows and six columns. Note that, in the comparative example illustrated in FIG. 14, three first element groups U1, each of which includes one set of the radiation elements 121*a* to 121*d* of four types, are linearly disposed in the column direction. This arrangement pattern does not satisfy the requirement 1 described above.

Figure 15:
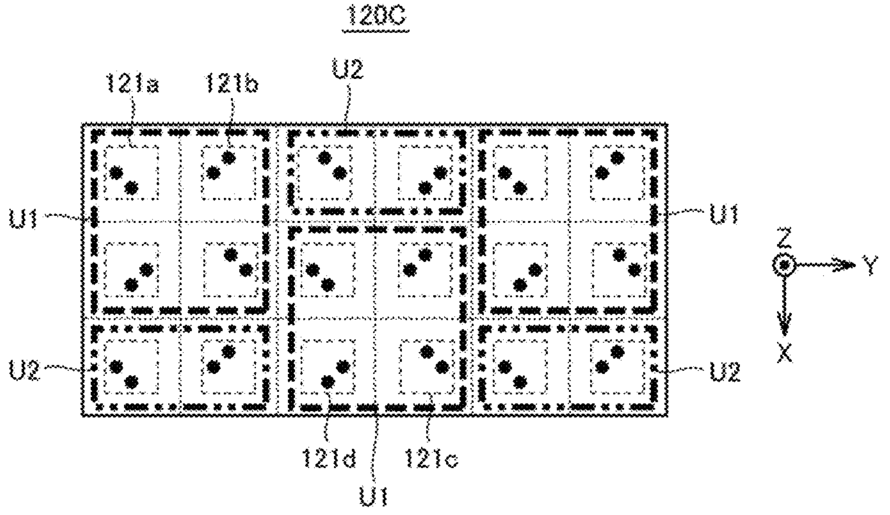
FIG. 15 is a diagram illustrating an arrangement of the plurality of radiation elements in the antenna device according to Modification 6.

FIG. 15 is a diagram illustrating the arrangement of the plurality of radiation elements 121 in an antenna device 120C according to Modification 6. In the antenna device 120C, the plurality of radiation elements 121 are arranged in a matrix of three rows and six columns.

In the antenna device 120C, three first element groups U1, each of which includes one set of the radiation elements 121*a* to 121*d* of four types, are disposed in a zigzag manner in the column direction. Accordingly, this arrangement pattern satisfies the requirement 1 described above.

Further, in the antenna device 120C, three second element groups U2, each of which includes two types of the radiation elements 121 among the radiation elements 121*a* to 121*d* of four types, are disposed adjacent to the respective first element groups U1 in the row direction. Accordingly, this arrangement pattern satisfies also the requirement 2 described above.

Further, in the antenna device 120C, each of the two radiation elements 121 in each of the second element groups U2 is an element of a type obtained by rotating at least one of the radiation elements 121 in the first element group U1, both of which are adjacent to the two radiation elements 121, by 90 degrees. For example, the first type radiation element 121*a* disposed at (3×1) in the second element group U2 is obtained by rotating clockwise the fourth type radiation element 121*d* disposed at (2×1) in the first element group U1, which is adjacent to the radiation element 121*a* at (3×1), by 90 degrees, and translating the rotated fourth type radiation element 121*d*. The second type radiation element 121*b* disposed at (3×2) in the second element group U2 is obtained by rotating counterclockwise the third type radiation element 121*c* disposed at (2×2) in the first element group U1, which is adjacent to the radiation element 121*b* at (3×2), by 90 degrees, and translating the rotated third type radiation element 121*c*. Further, the second type radiation element 121*b* disposed at (3×2) in the second element group U2 is obtained by rotating clockwise the first type radiation element 121*a* disposed at (2×3) in the first element group U1, which is adjacent to the radiation element 121*b* at (3×2), by 90 degrees, and translating the rotated first type radiation element 121*a*. Accordingly, this arrangement pattern satisfies also the requirement 3 described above.

Figure 16:
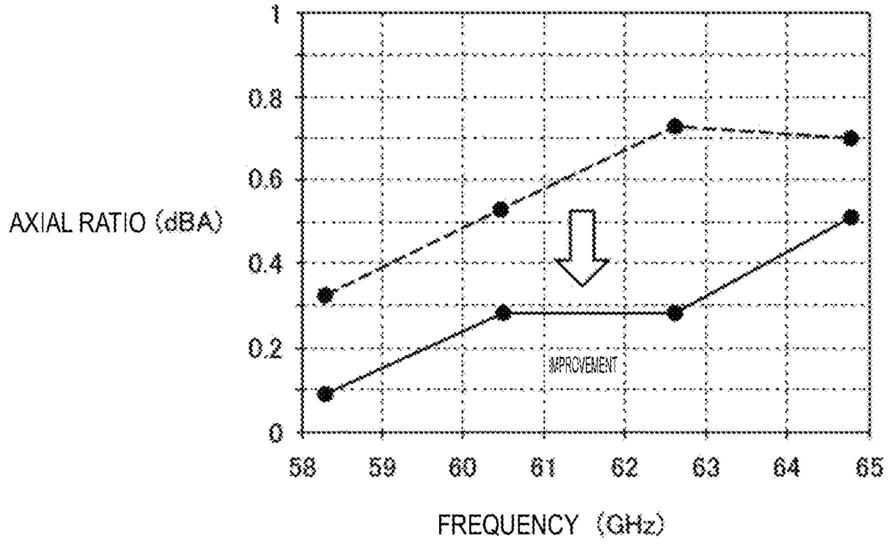
FIG. 16 is a graph comparing the axial ratio characteristics of the antenna device according to the comparative example with the axial ratio characteristics of the antenna device according to Modification 6.

FIG. 16 is a graph comparing the axial ratio characteristics of the antenna device according to the comparative example illustrated in FIG. 14 with the axial ratio characteristics of the antenna device 120C according to Modification 6 illustrated in FIG. 15. In FIG. 16, the axial ratio characteristics of the antenna device according to the comparative example are indicated by a dashed line, and the axial ratio characteristics of the antenna device 120C according to Modification 6 are indicated by a solid line. From the difference in characteristics illustrated in FIG. 16, it is understood that the axial ratio characteristics are improved in the antenna device 120C relative to in the comparative example.

As described above, by making the arrangement of the radiation elements 121 in the antenna device as the arrangement pattern satisfying the requirements 1 to 3 above, it may be made simple to improve the axial ratio characteristics similarly to the embodiment described above, even in the case that the plurality of radiation elements 121 are arranged in a matrix of odd-numbered rows and even-numbered columns.

Among the three requirements 1 to 3 described above, satisfying the requirements 1 and 2 makes it possible to expect the improving effect of the axial ratio characteristics, even in the case that the requirement 3 is not satisfied.

The "first element group U1" and the "second element group U2" according to Modification 6 may correspond to the "first element group" and the "second element group" of the present disclosure, respectively.

The features of the embodiment described above and Modification 1 to Modification 6 thereof can be appropriately combined with each other within a range that no contradiction occurs.

It should be understood that the embodiment disclosed herein is exemplary and non-restrictive in every respect. The scope of the present disclosure is indicated by the scope of claims rather than the description of the embodiment described above, and it is intended to include all modifications within the meaning and range of equivalency of the scope of claims.

The invention claimed is:

1. A circular polarization array antenna device, comprising:
- an element group that includes a plurality of elements each configured to radiate a circularly polarized wave and arranged in a matrix of N rows and M columns, in which N is an odd number of three or more and M is four or more being a multiple of four, wherein
- the plurality of elements include the same number of elements of four types having a positional relationship rotationally symmetric with each other, and
- the plurality of elements are arranged such that adjacent elements are of types different from each other.

2. The circular polarization array antenna device of claim 1, wherein
- the plurality of elements are arranged in a matrix of three rows and four columns.

3. The circular polarization array antenna device of claim 2, wherein
- the number of each of the elements of four types is three.

4. The circular polarization array antenna device of claim 3, wherein
- when any integer from 1 to 3 is denoted by n, any integer from 1 to 4 is denoted by m, and a position of an n-th row and an m-th column in a matrix is denoted by (n×m), the elements of four types include
- a first type element disposed at (1×1), (2×3), and (3×1),
- a second type element disposed at (1×2), (2×4), and (3×2),
- a third type element disposed at (1×3), (2×1), and (3×3), and
- a fourth type element disposed at (1×4), (2×2), and (3×4).

5. The circular polarization array antenna device of claim 2, wherein
- the second type element is obtained by rotating the first type element by 90 degrees in a predetermined rotation direction and translating the rotated first type element.

6. The circular polarization array antenna device of claim 5, wherein
- the third type element is obtained by rotating the first type element by 270 degrees in the predetermined rotation direction and translating the rotated first type element.

7. The circular polarization array antenna device of claim 6, wherein
- the fourth type element is obtained by rotating the first type element by 180 degrees in the predetermined rotation direction and translating the rotated first type element.

8. The circular polarization array antenna device of claim 1, wherein
- each of the plurality of elements has two feed point.

9. The circular polarization array antenna device of claim 8, wherein
- the circular polarization array antenna device further comprises a plurality of hybrid circuits each coupled to corresponding one of the plurality of elements.

10. The circular polarization array antenna device of claim 9, wherein
- each of the plurality of hybrid circuits includes a first terminal coupled to one of the two feed points of a corresponding one of the plurality of elements.

11. The circular polarization array antenna device of claim 10, wherein
- each of the plurality of hybrid circuits includes a second terminal coupled to another of the two feed points of the corresponding one of the plurality of elements.

12. The circular polarization array antenna device of claim 11, wherein
- each of the plurality of hybrid circuits includes a third terminal to which a radio frequency signal is inputted from outside.

13. The circular polarization array antenna device of claim 12, wherein
- each of the plurality of hybrid circuits includes first to fourth transmission lines each having an electrical length equal to one fourth of a wavelength of the radio frequency signal.

14. The circular polarization array antenna device of claim 13, wherein
- one end of the first transmission line is coupled to one end of the second transmission line,
- another end of the second transmission line is coupled to one end of the third transmission line,
- another end of the third transmission line is coupled to one end of the fourth transmission line, and another end of the fourth transmission line is coupled to another end of the first transmission line.

15. The circular polarization array antenna device of claim 14, wherein the first terminal is coupled between the first transmission line and the second transmission line, the second terminal is coupled between the second transmission line and the third transmission line, and the third terminal is coupled between the first transmission line and the fourth transmission line.

16. The circular polarization array antenna device of claim 15, wherein the first transmission line and the third transmission line have a curved shape.

17. A circular polarization array antenna device, comprising:

an element group that includes a plurality of elements each configured to radiate a circularly polarized wave and arranged in a matrix of three rows and K columns, in which K is an even number of four or more, wherein the plurality of elements include elements of four types having a positional relationship rotationally symmetric with each other, and the elements of four types include a first type element, a second type element obtained by rotating the first type element by 90 degrees in a predetermined direction, a third type element obtained by rotating the first type element by 270 degrees in the predetermined direction, and a fourth type element obtained by rotating the first type element by 180 degrees in the predetermined direction.

18. The circular polarization array antenna device of claim 17, wherein the plurality of elements are included in a plurality of first element groups each of which includes four elements arranged in two rows and two columns and which are disposed in a zigzag manner in a column direction, and a plurality of second element groups each of which includes two elements arranged in one row and two columns and each of which is disposed adjacent to a corresponding one of the plurality of first element groups in a row direction, and the four elements included in the first element group include each one of the elements of four types, and the two elements included in the second element group include elements of two of the four types.

19. The circular polarization array antenna device of claim 18, wherein each of the two elements in each of the second element groups is an element of a type obtained by rotating at least one of elements in the first element group, both of which are adjacent to the two elements, by 90 degrees.

20. A circular polarization array antenna device, comprising:

a plurality of antenna elements each configured to radiate a circularly polarized wave, wherein the plurality of antenna elements are arranged in a matrix of N rows and M columns, in which N is an odd number of three or more and M is four or more being a multiple of four, the plurality of antenna elements include four types of antenna elements, each of the four types of antenna elements having a 90 degree symmetrically rotational relationship with respect to another of the types of antenna elements, and the plurality of elements are arranged such that adjacent elements are of different types.

* * * * *